US012755761B2

(12) United States Patent
Jung

(10) Patent No.: US 12,755,761 B2
(45) Date of Patent: Oct. 6, 2026

(54) APPARATUS FOR PROVIDING INFORMATION AND METHOD THEREOF

(71) Applicant: Coupang Corp., Songpa-gu (KR)

(72) Inventor: Ji Yun Jung, Seoul (KR)

(73) Assignee: Coupang Corp., Seoul (KR)

(*) Notice: Subject to any disclaimer, the term of this patent is extended or adjusted under 35 U.S.C. 154(b) by 0 days.

(21) Appl. No.: 18/808,621

(22) Filed: Aug. 19, 2024

(65) Prior Publication Data

US 2026/0038531 A1 Feb. 5, 2026

(30) Foreign Application Priority Data

Jul. 30, 2024 (KR) ........................ 10-2024-0101074

(51) Int. Cl.

| | |
|---|---|
| ***G11B 27/10*** | (2006.01) |
| ***H04N 21/44*** | (2011.01) |
| ***H04N 21/442*** | (2011.01) |
| ***H04N 21/45*** | (2011.01) |
| ***H04N 21/454*** | (2011.01) |
| ***H04N 21/472*** | (2011.01) |
| ***H04N 21/845*** | (2011.01) |

(52) U.S. Cl.

CPC ....... *G11B 27/10* (2013.01); *H04N 21/44204* (2013.01)

(58) Field of Classification Search

None

See application file for complete search history.

(56) References Cited

U.S. PATENT DOCUMENTS

| | | | | |
|---|---|---|---|---|
| 10,560,739 | B2 | 2/2020 | Kim et al. | |
| 10,887,654 | B2 | 1/2021 | Kim et al. | |
| 2016/0057497 | A1 | 2/2016 | Kim et al. | |
| 2018/0108048 | A1 | 4/2018 | Yoon et al. | |
| 2021/0409822 | A1* | 12/2021 | Aher | H04N 21/47217 |
| 2022/0058215 | A1* | 2/2022 | Johnson | H04N 21/4755 |

FOREIGN PATENT DOCUMENTS

| | | | |
|---|---|---|---|
| CN | 106134211 | B | 4/2021 |
| CN | 114125562 | A | 3/2022 |
| JP | 2008-193585 | A | 8/2008 |
| JP | 2009-105584 | A | 5/2009 |
| KR | 10-2000-0054561 | A | 9/2000 |
| KR | 10-1369747 | B1 | 3/2014 |
| KR | 10-1777242 | B1 | 9/2017 |
| KR | 10-2012676 | B1 | 8/2019 |
| KR | 10-2019-0114548 | A1 | 10/2019 |
| KR | 10-2271854 | B1 | 7/2021 |
| KR | 10-2024-0023839 | A | 2/2024 |

* cited by examiner

*Primary Examiner* — Hung Q Dang

(74) *Attorney, Agent, or Firm* — Fish & Richardson P.C.

(57) ABSTRACT

A method of providing information by an electronic apparatus includes: identifying a first video to be provided to a target user, determining, based on information regarding the target user, whether the first video includes a segment that corresponds to a segment of a previously played video on which an action was previously performed, among one or more segments of the first video, and, based on a determination that the first video includes the segment, (i) identifying that a relationship between a current playback position in the first video and a time period associated with the segment in the first video satisfies a set condition and (ii) adjusting, based on the relationship satisfying the set condition, the current playback position to a position following the segment.

20 Claims, 6 Drawing Sheets

APPARATUS FOR PROVIDING INFORMATION AND METHOD THEREOF

CROSS-REFERENCE TO RELATED APPLICATION(S)

This application claims the benefit of Korean Patent Application No. 10-2024-0101074, filed on Jul. 30, 2024, in the Korean Intellectual Property Office, the disclosure of which is incorporated herein by reference.

TECHNICAL FIELD

The present disclosure relates to an apparatus for providing information, and more particularly, a method for removing an identified portion of the information prior to provision.

BACKGROUND

A video platform provides videos to users via the internet, allowing users to easily search for content that suits their preferences and watch videos conveniently. Each user's viewing preferences may vary, encompassing not only the type of videos they prefer but also their preference for viewing the entire content of a video or selectively skipping certain portions (e.g., skipping non-essential parts like opening sequences). When content that user has no intention of watching is repeatedly presented, it can cause inconvenience and disrupt the viewing experience.

SUMMARY

The present disclosure is directed to providing information to a target user by removing an identified portion of the information prior to provision.

According to one aspect of the subject matter described in this application, a method of providing information by an electronic apparatus can include: identifying a first video to be provided to a target user, determining, based on information regarding the target user, whether the first video includes a segment that corresponds to a segment of a previously played video on which an action was previously performed, among one or more segments of the first video, and, based on a determination that the first video includes the segment (i) identifying that a relationship between a current playback position in the first video and a time period associated with the segment in the first video satisfies a set condition and (ii) adjusting, based on the relationship satisfying the set condition, the current playback position to a position following the segment.

Implementations according to this aspect can include one or more of the following features. For example, determining whether the first video includes the segment can include obtaining video viewing history information of the target user, identifying, from the video viewing history information, one or more actions related to interaction of the target user with videos, and identifying, based on the identified one or more actions, whether a segment corresponding to a segment of a previously played video is present among the one or more segments.

In some examples, identifying whether the segment is present among the one or more segments can further include at least one of determining whether the one or more actions include a request by the target user to skip a currently playing segment, or determining whether the one or more actions include an action indicating that the target user does not want to view a currently playing segment. In some examples, obtaining the video viewing history information can include identifying one or more videos satisfying a set criterion related to the first video, and obtaining viewing history information of the target user for the identified one or more videos.

In some implementations, the set criterion can include a requirement that a video belongs to a same playlist as the first video. In some examples, determining whether the first video includes the segment can further include obtaining preference information related to the interaction of the target user with videos based on the one or more actions, and identifying whether a segment corresponding to a segment of a previously played video is present can include identifying, based on the one or more actions and the preference information, whether her a segment corresponding to a segment of a previously played video is present.

In some implementations, determining whether the first video includes a segment can include identifying one or more attributes associated with each of the one or more segments: and determining whether the first video includes the segment based on the one or more attributes, where the one or more attributes can include at least one of a type of segment, a position of segment in the first video, or a production subject of segment. In some examples, identifying the one or more attributes can include obtaining metadata of the first video, the metadata including at least one of the one or more attributes.

In some implementations, the segment can include at least one of an opening section of the first video, an ending section of the first video, a story summary section for the first video, or additional material configured to play after completion of a main portion of the first video. In some implementations, the set condition can include a condition that a time interval between the current playback position and a starting point of the time period is less than a set threshold value. In some implementations, the set condition can include a condition that an input for changing a playing position of the first video to the position following the segment is not received from the target user.

According to another aspect of the subject matter described in this application, a non-transitory recording medium storing a program, where execution of the program can cause one or more computers to perform operations comprising identifying a first video to be provided to a target user, determining, based on information regarding the target user, whether the first video includes a segment that corresponds to a segment of a previously played video on which an action was previously performed, among one or more segments of the first video, and, based on a determination that the first video includes the segment (i) identifying that a relationship between a current playback position in the first video and a time period associated with the segment in the first video satisfies a set condition and (ii) adjusting, based on the relationship satisfying the set condition, the current playback position to a position following the segment.

According to another aspect of the subject matter described in this application, an electronic apparatus for providing information can include a memory storing instructions, and a processor configured to execute the instructions to perform operations. The operations can include identifying a first video to be provided to a target user, determining, based on information regarding the target user, whether the first video includes a segment that corresponds to a segment of a previously played video on which an action was previously performed, among one or more segments of the first video, and, based on a determination that the first video includes the segment (i) identifying that a relationship between a current playback position in the first video and a time period associated with the segment in the first video satisfies a set condition and (ii) adjusting, based on the relationship satisfying the set condition, the current playback position to a position following the segment.

Implementations according to this aspect can include one or more of the following features. For example, determining whether the first video includes the segment can include obtaining video viewing history information of the target user, identifying, from the video viewing history information, one or more actions related to interaction of the target user with videos, and identifying, based on the identified one or more actions, whether a segment corresponding to a segment of a previously played video is present among the one or more segments.

In some examples, identifying whether the segment is present among the one or more segments can further include at least one of determining whether the one or more actions include a request by the target user to skip a currently playing segment, or determining whether the one or more actions include an action indicating that the target user does not want to view a currently playing segment. In some examples, obtaining the video viewing history information can include identifying one or more videos satisfying a set criterion related to the first video, and obtaining viewing history information of the target user for the identified one or more videos.

In some examples, the set criterion can include a requirement that a video belongs to a same playlist as the first video. In some implementations, determining whether the first video includes the segment can further include obtaining preference information related to the interaction of the target user with videos based on the one or more actions, and identifying whether her a segment corresponding to a segment of a previously played video is present can include identifying, based on the one or more actions and the preference information, whether her a segment corresponding to a segment of a previously played video is present.

In some implementations, determining whether the first video includes a segment can include identifying one or more attributes associated with each of the one or more segments: and determining whether the first video includes the segment based on the one or more attributes, where the one or more attributes can include at least one of a type of segment, a position of segment in the first video, or a production subject of segment, and identifying the one or more attributes can include obtaining metadata of the first video, the metadata including at least one of the one or more attributes. In some implementations, the segment can include at least one of an opening section of the first video, an ending section of the first video, a story summary section for the first video, or additional material configured to play after completion of a main portion of the first video, the set condition can include a condition that a time interval between the current playback position and a starting point of the time period is less than a set threshold value, and the set condition can include a condition that an input for changing a playing position of the first video to the position following the segment is not received from the target user.

DETAILED DESCRIPTION

Conventional OTT platforms typically require users to manually skip unwanted segments, such as introductory scenes, each time an episode begins. This redundancy leads to repeated user input, detracting from a seamless viewing experience and requiring additional interaction, especially when the viewer consistently skips the same segment across multiple episodes.

The present disclosure addresses this by implementing an automated playback adjustment based on user viewing history. Once a user skips a specific segment (e.g., an opening sequence), the system records this preference in a structured data format. When subsequent episodes of the same series are played, the system recognizes the recorded segment as one that the user previously skipped and automatically adjusts the playback start time to bypass this segment. This reduces the need for repeated manual input and enhances the efficiency of the viewing experience by offering a seamless transition to the main content.

Further, by analyzing repeated user actions, the system dynamically identifies segments that are frequently skipped, associating these segments with specific playback start conditions. For example, if the system detects that a significant number of users consistently skip a show's introductory scene, it can proactively prompt playback to bypass this segment, thereby aligning play back to the viewer's preferences. This approach leverages both individual and aggregate data, improving navigation efficiency and enhancing user satisfaction, especially for popular or binge-watched series.

Figure 1:
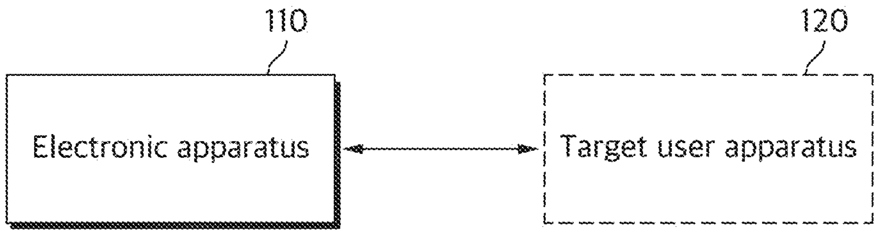
FIG. 1 is a block diagram illustrating an example of a system for providing information.

FIG. 1 is a block diagram illustrating an example of a system for providing information.

The system for providing information can include an electronic apparatus 110. In some implementations, the system for providing information can further include a target user apparatus 120. The system for providing information can further include a network that supports information transmission and reception between at least one of the electronic apparatus 110, the target user apparatus 120, or an external apparatus.

The electronic apparatus 110 and the target user apparatus 120 can include a memory, a processor, and a transceiver. In some implementations, each of the electronic apparatus 110 and the target user apparatus 120 can refer to a device that processes or executes at least one function or operation, which can be implemented as hardware, software, or a combination thereof.

In some implementations, the electronic apparatus 110 and the target user apparatus 120 can each operate as separate devices or servers. However, they may also share a logically divided structure, and, in some implementations, can be implemented as separate functions within a single apparatus or server. For example, the electronic apparatus 110 and the target user apparatus 120 can be implemented within a single apparatus. In this case, any data transmission or reception between the electronic apparatus 110 and the target user apparatus 120 would effectively represent an internal data exchange within that single apparatus.

The electronic apparatus 110 can include a server, such as a central server for service provision and data processing. In some implementations, the electronic apparatus 110 can also include an apparatus used directly by the target user, such as a portable terminal. Therefore, the scope of the present disclosure is not limited by the specific entity (e.g., server or user apparatus) performing the functions of the electronic apparatus 110.

In some implementations, both the electronic apparatus 110 and the target user apparatus 120 can include a number of computer systems or computer software configured network servers. For example, at least one of the electronic apparatus 110 or the target user apparatus 120 can refer to a computer system and computer software, connected to subordinate devices that can communicate with other network servers over a computer network, such as an intranet or the Internet, which receives requests to perform operations and performs the operations and provides results. In addition, at least one of the electronic apparatus 110 and the target user apparatus 120 can refer to a broad system of applications running on a network server, along with internal or external databases connected across various nodes.

For example, at least one of the electronic apparatus 110 or the target user apparatus 120 can run server programs compatible with different operating systems, such as DOS, Windows, Linux, UNIX, and MacOS. While these entities are labeled as the electronic apparatus 110 and the target user apparatus 120 for descriptive convenience, they encompass wide range of devices, including computers and mobile communication terminals, and can be integrated with or inclusive of various device types.

The electronic apparatus 110 can obtain and process and/or provide various information. The electronic apparatus 110 can perform various operations for providing information. For example, the electronic apparatus 110 can identify a first video to be provided to a target user, based on information regarding the target user, determine whether the first video includes a segment that corresponds to a segment of a previously played video on which an action was previously performed, among one or more segments of the first video, and, based on a determination that the first video includes the segment, (i) identify that a relationship between a current playback position in the first video and a time period associated with the segment in the first video satisfies a set condition and (ii) adjust, based on the relationship satisfying the set condition, the current playback position to a position following the segment. In some implementations, the electronic apparatus 110 can obtain video viewing history information of the target user, identify, from the video viewing history information, one or more actions related to interaction of the target user with videos, and identify, based on the identified one or more actions, whether a segment corresponding to a segment of a previously played video is present among the one or more segments.

The target user can include a variety of individuals using a video platform. The video platform can provide, but is not limited to, a video streaming service and can also provide a portal service providing videos or a social media service. Hereinafter, "video streaming service" is mainly described for descriptive convenience, however, the descriptions herein apply to other service types as well.

The target user apparatus 120 can be an apparatus manipulated and managed by the target user, capable of interacting with the target user and interfacing with devices such as the electronic apparatus 110. For example, the target user apparatus 120 can receive a video request from the target user and transmit the request to the electronic apparatus 110. In addition, the target user apparatus 120 can receive, from the electronic apparatus 110, an instruction to adjust a viewing timepoint of the first video, adjust the viewing timepoint based the instruction, and provide (for example, display a page on a screen) the target user with updated information indicating the adjusted viewing timepoint and a video corresponding to the adjusted viewing timepoint.

Further operational details of the electronic apparatus 110 and the target user apparatus 120 will be described below referring to FIGS. 2 to 5.

The electronic apparatus 110 and the target user apparatus 120 can include a range of devices, such as a computer device, a mobile communication terminal, and a server. The electronic apparatus 110 and the target user apparatus 120 can also include, or connected to, input devices (e.g., a touchpad, a mouse, and a keyboard) and output devices (e.g., a screen, a speaker, and an interface device) for user interactions. Furthermore, the input device and the output device of the electronic apparatus 110 and the target user apparatus 120 can be integrated or interconnected, and for example, an interface for receiving an input can be displayed on at least one of the electronic apparatus 110 or the target user apparatus 120.

A series of operations related to a method of providing information can be implemented on a single physical apparatus or by a coordinated set of multiple devices. For example, some components of the system for providing information can be implemented by one physical device while others can be implemented by separate devices. For example, any one physical apparatus can be implemented as a portion of the electronic apparatus 110 and another physical apparatus can be implemented as a portion of the target user apparatus 120 or a portion of other external apparatuses. In some implementations, each element included in the system for providing information can be distributed and arranged in each different physical apparatus, and the distributed and arranged elements can be combined organically and implemented to perform a function and an operation of the system for providing information. For example, the electronic apparatus 110 of the present disclosure can include one or more sub-apparatuses, with specific operations assigned to a first sub-apparatus and others to a second sub-apparatus.

Figure 2:
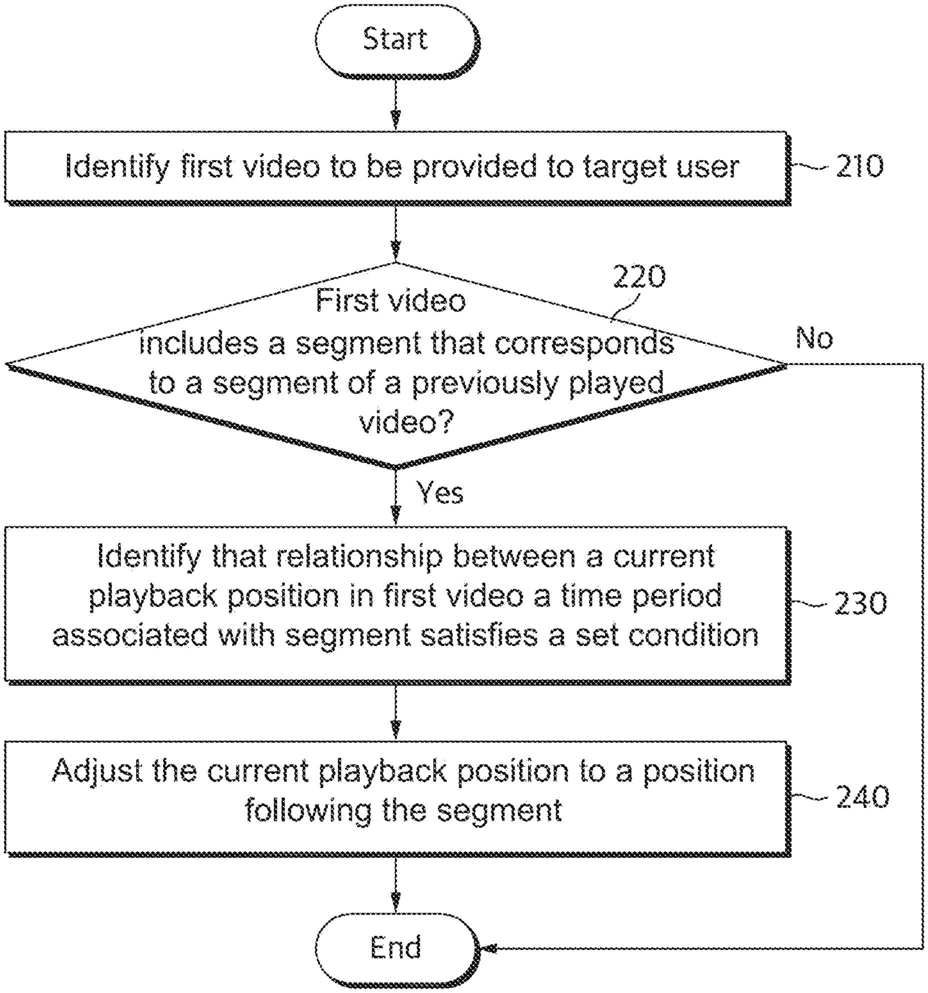
FIG. 2 is a flowchart illustrating an example of an operation of an electronic apparatus providing information.

FIG. 2 is a flowchart illustrating an example of an operation of an electronic apparatus providing information.

Referring to FIG. 2, the electronic apparatus 110 can identify a first video to be provided to a target user (operation 210). In some implementations, the electronic apparatus 110 can obtain a request for providing the first video from the target user. For example, obtaining the request from the target user can include receiving request information from the target user apparatus 120 or receiving a direct input from the target user.

However, the operation of the electronic apparatus 110 identifying the first video is not limited thereto. For example, the electronic apparatus 110 can also select the first video as a video to be automatically provided to the target user. By way of further example, when an input is not generated by the target user for a set time after playing a previous video has ended, the electronic apparatus 110 can select the first video as a subsequent video to be automatically provided to the target user.

Based on information of the target user, the electronic apparatus 110 can determine whether content unsuitable to be provided to the target user is present among one or more contents included in the first video (operation 220). For example, the electronic apparatus 110 can determine, based on information regarding the target user, whether the first video includes a segment that corresponds to a segment of a previously played video on which an action was previously performed, among one or more segments of the first video.

In some implementations, the electronic apparatus 110 can obtain video viewing history information of the target user. The electronic apparatus 110 can identify, from the video viewing history information, one or more actions related to interaction of the target user with videos. The electronic apparatus 110 can identify whether content unsuitable to be provided to the target user is present among the one or more contents based on the one or more actions. For example, the electronic apparatus 110 can identify, based on the identified one or more actions, whether a segment corresponding to a segment of a previously played video is present among the one or more segments.

Identifying whether content unsuitable to be provided to the target user based on one or more identified actions related to video viewing of the target user will be described. For example, the electronic apparatus 110 can identify which videos are viewed by the target user, and, more specifically, can consider information regarding history of a video that was requested by the target user explicitly and information regarding history of a video that was automatically played for over a predetermined time without objection from the target user.

In some implementations, the electronic apparatus 110 can determine that the one or more actions include a request by the target user to skip of a currently playing segment or an action which is assumed to indicate that the target user does not want content playing. For example, the action which is assumed to indicate that the target user does not want content playing can refer to an action indicating that the target user does not want to view a currently playing segment.

To help with understanding, "opening content" can be used as an example. An "action requesting a skip of content playing" can include, for example, a user-initiated "skip opening" input. Similarly, an "action assumed to indicate that content playing is not wanted" can include a skip input provided within a specified time after an opening video begins playing (or "within a set time before an opening video starts").

One example of a skip input for the viewing timepoint can include the target user repeatedly moving the viewing timepoint back by a predetermined interval (e.g., 10 seconds) more than a specified number of times. Another example can include an input corresponding to a timestamp bar positioned within a designated range from the end of the opening: in this case, the video at that specified timepoint can play according to the selected timestamp.

When the one or more actions include requesting a skip of content playing from the target user or an action which is assumed to indicate that the target user does not want content playing, the electronic apparatus 110 can determine that the target user's preference to exclude the corresponding content during subsequent playback has been established based on previous viewing behavior.

In some implementations, the electronic apparatus 110 can identify one or more videos satisfying a set criterion related to the first video and obtain viewing history information of the target user for the identified one or more videos.

The "set criterion" related to the first video can include a requirement that criterion requiring a video belongs to a same playlist as the first video. With regard thereto, the "playlist" can include, but is not limited to, a playlist generated by a service provider (for example, a video platform service provider) and can be widely construed such as a playlist generated by the target user or a playlist generated by another user. In some implementations, the "criterion requiring a video to fall within an identical playlist to the first video" can be, but is not limited to, a criterion requiring a video to fall within a playlist that the target user currently uses to view the first video (for example, when the target user views the first video included in "A series playlist" generated by a service provider, another video falling within "A series playlist" satisfies a set criterion in relationship with the first video).

In some implementations, the playlist generated by a service provider can also include a channel set by the service provider, such as a "Chinese drama and movie channel" for example. However, the present disclosure is not limited thereto.

The "set criterion" of the present disclosure is not limited to a criterion requiring a video to fall within an identical playlist to the first video. For example, the "set criterion" can include at least one of a criterion requiring a video to have an identical producer to the first video, a criterion requiring that one or more of a type (for example, movie) and a genre (for example, thriller) are identical to the first video, or a criterion requiring that a released time period (for example, the second quarter of 2022) is identical to the first video. In addition, not as limited to the examples, various example implementations related to the "set criterion" may be present.

In some implementations, the electronic apparatus 110 can also obtain preference information related to the interaction of the target user with videos based on the identified one or more actions. For example, the electronic apparatus 110 can further identify whether content unsuitable to be provided to the target user is present based on the preference information. The preference can include, but is not limited to, information such as "a user mostly preferring to view an opening," "a user mostly preferring to view an opening in an animation only," and "a user mostly not preferring to view a story summary" for example. The preference information can be obtained based on one or more of the number of times that content is skipped by the target user, a rate of content skips by the target user, and a type of content skipped by the target user, but the present disclosure is not limited thereto.

In some implementations, the electronic apparatus 110 can identify one or more attributes associated with each of the one or more contents and determine whether content unsuitable to be provided to the target user is present based on the identified one or more attributes. For example, the electronic apparatus 110 can identify one or more attributes associated with each of the one or more segments to thereby determine whether the first video includes the segment based on the one or more attributes.

The one or more attributes can include at least one of a type of content, a position of content on the first video, or a production subject of content. The type of content can include a type (for example, opening, ending, story summary, and the like) of the content itself, and in some example implementations can further include a type (for example, animation, movie, drama, and the like) of the first video including the content. The position of content can include information on a timepoint (for example, a timepoint that the content starts at 6 minutes after playing the first video starts) that the content starts in the first video and can also include information on a timepoint (for example, a timepoint that the content ends at 7 minutes 30 seconds after playing the first video starts) that the content ends, and accordingly, playing length information of content can be also included in information on the position of content. The production subject of content can include various information on a production company, a producer, a scripter, and a director of the content (or the first video including the content).

In addition to the information described above, one or more attributes can include various information. For example, one or more attributes can further include an effort into content (for example, content including multiple splendid presentations, content including high-quality music, and content with high production costs) or a degree of similarity with content of other videos viewed previously by a user (for example, whether an opening is identical to or different from an opening of a video viewed previously by the user). In addition, various example implementations related to one or more attributes may be present.

In some implementations, the electronic apparatus 110 can obtain metadata for providing the first video, and the metadata can include at least one of the one or more attributes.

Based on a determination that first content unsuitable to be provided to the target user is present among one or more contents included in the first video (operation 220 and YES), the electronic apparatus 110 can identify that a relationship between a timepoint played by the target user on the first video and a time period for the first content on the first video satisfies a set condition (operation 230) and adjusts a viewing timepoint of the first video for the target user so that a video of a timepoint after the time period is provided (operation 240). For example, based on a determination that the first video includes a segment that corresponds to a segment of a previously played video on which an action was previously performed, the electronic apparatus 110 can identify that a relationship between a current playback position in the first video and a time period associated with the segment in the first video satisfies a set condition, and adjust, based on the relationship satisfying the set condition, the current play back position to a position following the segment.

In some implementations, when an opening of the first video is determined as the first content unsuitable to be provided to the target user, the electronic apparatus 110 can identify that a timepoint played by the target user on the first video reaches an opening section of the first video and adjust a viewing timepoint of the first video for the target user so that a video of a timepoint after the opening section is provided (in other words, an opening is skipped).

The first content can include at least one of opening content of the first video, ending content of the first video, story summary content for the first video, or sub-content disposed to be played after playing main content of the first video is completed. The "sub-content disposed to be played after playing main content is completed" can include, but is not limited to, the ending content of the first video, and for example, "a function of inquiring about whether to play a following video in succession" provided after playing the main content is completed can be also included in the "sub-content disposed to be played after playing main content is completed."

In addition to the examples, various example embodiments related to the first content can fall within the scope of the present disclosure.

In some implementations, the "set condition" in the relationship between the timepoint played by the target user on the first video and the time period for the first content on the first video can include a condition that a time interval between the timepoint played by the target user on the first video and a starting point of the time period for the first content is less than a set threshold value. For example, when the timepoint played by the target user on the first video is located within 10 seconds based on the starting point of the time period for the first content, it is determined that the set condition is satisfied.

In some implementations, the "set condition" can also include a condition that a time interval between the timepoint played by the target user on the first video and an ending point of the time period for the first content is less than a set threshold value.

In some implementations, the "set condition" can include a condition that the time interval is less than the set threshold value while the timepoint played by the target user on the first video is after the starting point of the time period for the first content or include a condition that the time interval is less than the set threshold value while the timepoint played by the target user on the first video is before the starting point (or the ending point) of the time period for the first content, and various example implementations can further fall within the scope of the present disclosure.

In some implementations, the "set condition" can further include a condition that an input for changing a playing position of the first video is not received from the target user. For example, even though a condition that a time interval between a timepoint played by the target user on the first video and a starting point of the time period for the first content is less than a set threshold value is satisfied, the set condition is determined not to be satisfied when the timepoint played by the target user on the first video becomes located in the corresponding timepoint by a timepoint change input of the target user. This may be because when a timepoint change input of the target user is present indicates a high possibility that the target user has an intention to view the first content.

Figure 3:
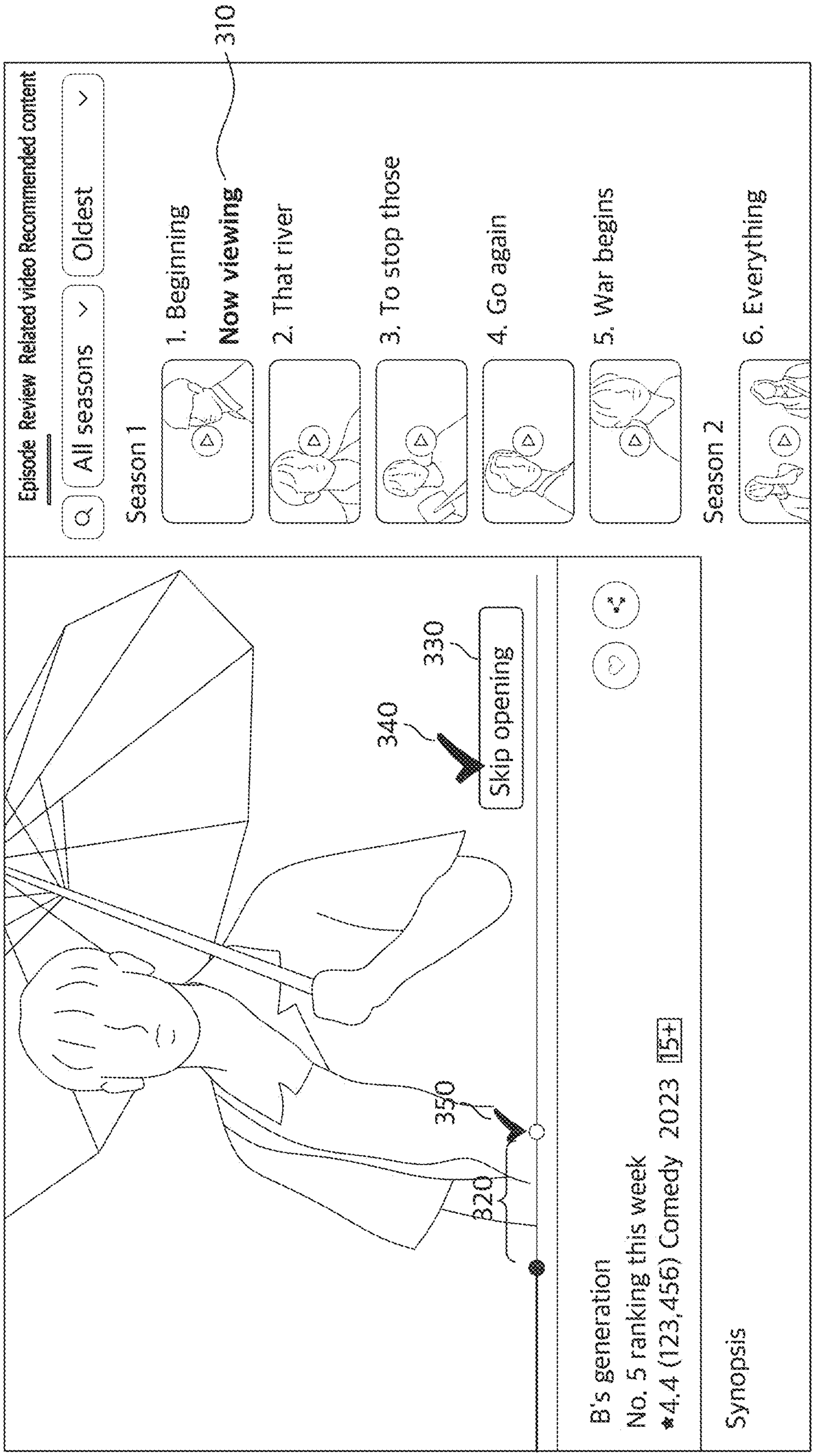
FIG. 3 is a diagram illustrating an example of process for identifying one or more user actions related to video viewing.

Detailed examples for helping understand the operations of the electronic apparatus 110 which are described above are illustrated in FIGS. 3 to 5. FIG. 3 is a diagram associated with operation 220 described above through FIG. 2 and corresponds to an exemplary diagram for illustrating an operation of identifying one or more actions related to video viewing of a target user. Referring to FIG. 3, the electronic apparatus 110 can obtain history that the target user is watching video "Season 1, 1. Beginning" (see reference numeral 310) among a plurality of videos that fall within an identical playlist. The obtained history can include information 340 indicating that an input of the target user for a function 330 of skipping an opening is received and information 350 indicating that an input of the target user corresponding to a timestamp bar within a set section from an ending timepoint of the opening is received. A time period where the opening is located can refer to reference numeral 320.

Figure 4:
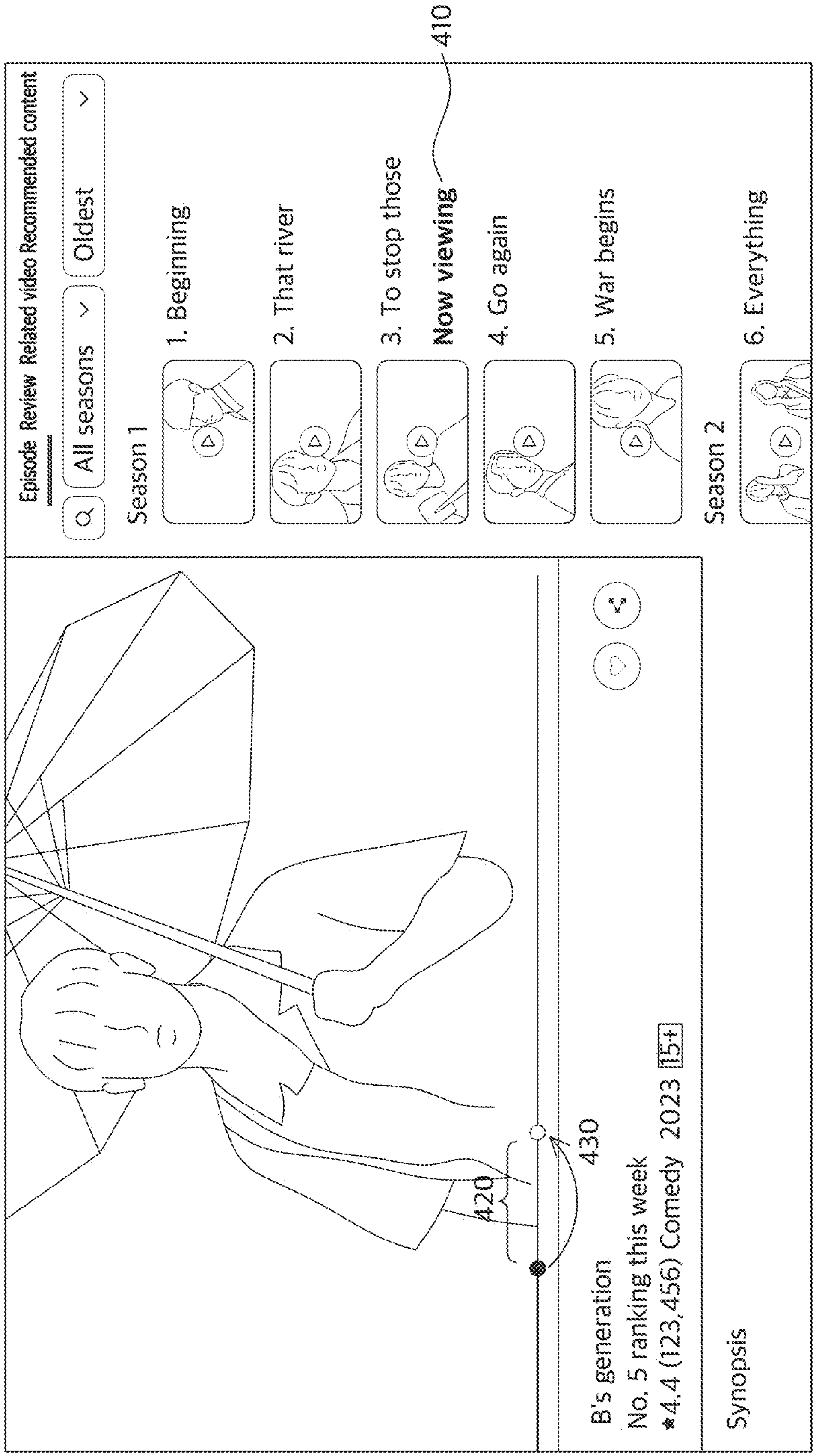
FIG. 4 is a diagram illustrating an example of adjusting a viewing timepoint of a first video for a target user.

FIG. 4 is a diagram associated with operation 230 and operation 240 described above through FIG. 2 and corresponds to an exemplary diagram for illustrating an operation of identifying that a relationship between a timepoint played by a target user on a first video and a time period for first content on the first video satisfies a set condition and adjusting a viewing timepoint of the first video for the target user so that a video of a timepoint after the time period is provided. Further referring to FIG. 4, the electronic apparatus 110 can identify that a playing timepoint of video "Season 1, 3. To stop those" (see reference numeral 410, corresponding to a first video) among a plurality of videos that fall within an identical playlist reaches a starting point of a time period 420 for first content (an "opening" in examples of FIGS. 3 to 5). In this case, the electronic apparatus 110 can adjust a viewing timepoint of the first video 410 for the target user so that a video after the time period 420 is provided (see reference numeral 430).

Figure 5:
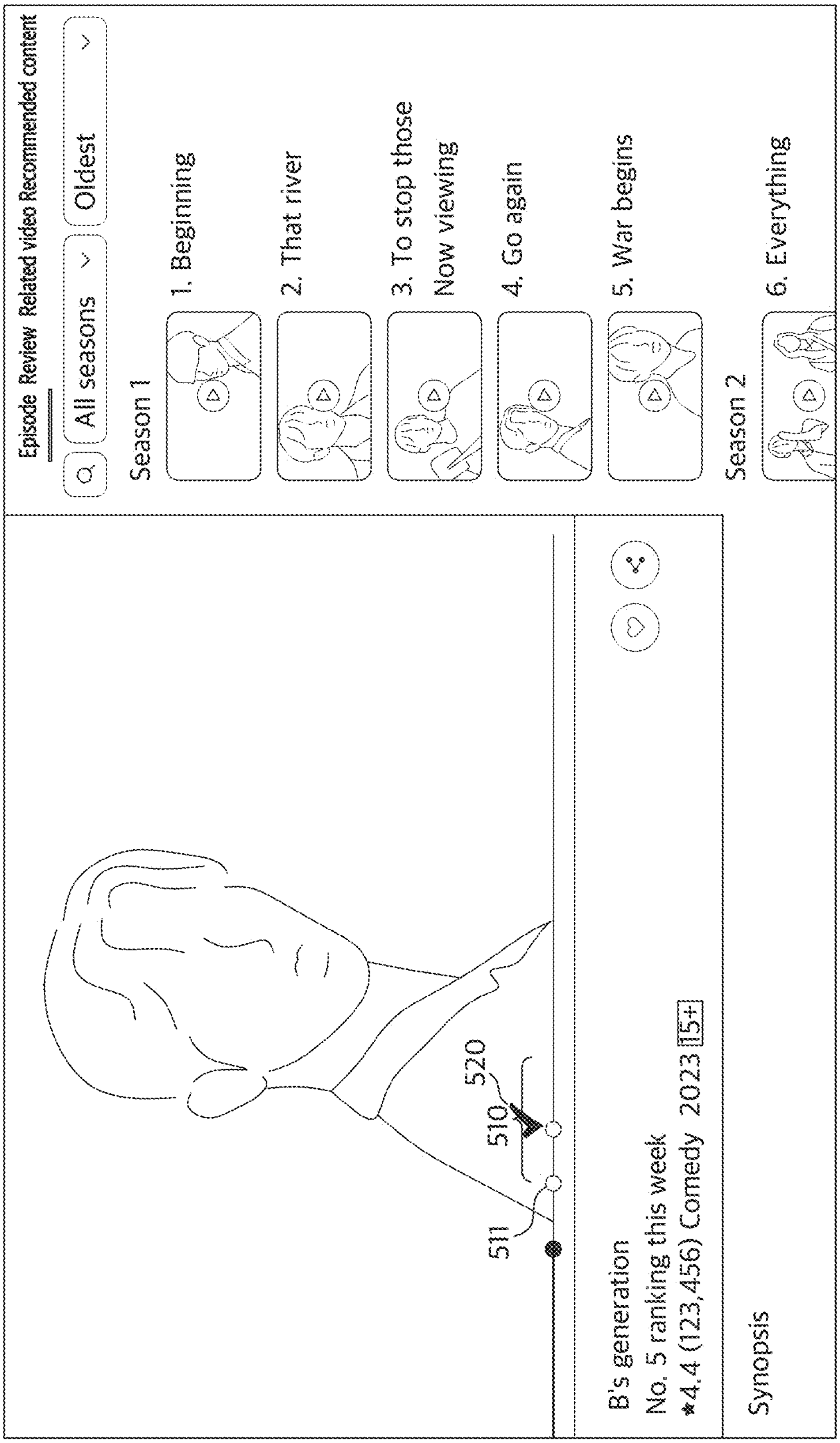
FIG. 5 is a diagram illustrating an example of a set condition related to a relationship between a timepoint played by a target user on a first video and a time period for first content on the first video.

FIG. 5 is a diagram associated with operation 230 described above through FIG. 2 and corresponds to an exemplary diagram for illustrating when a relationship between a timepoint played by a target user on a first video and a time period for first content on the first video does not satisfy a set condition. Referring to FIG. 5, when a time interval between a timepoint (a point indicated as a black circle on a timestamp illustrated) played by a target user on a first video and a starting point 511 of a time period (see reference numeral 510) for first content is greater than a set threshold value is illustrated. In this case, the set condition can be determined not to be satisfied. Alternatively, when an input for changing a playing position of the first video is received from the target user (see reference numeral 520), the electronic apparatus 110 can determine that the set condition is not satisfied even though a condition that a time interval between a playing position changed according to the input and a starting point of a time period for first content is less than a set threshold value is satisfied. Therefore, since cases such as the example illustrated in FIG. 5 do not correspond to a case of "identifying that a relationship between a timepoint played by the target user on the first video and a time period for the first content on the first video satisfies a set condition" of operation 230, a viewing timepoint of the first video for the target user may not be adjusted.

Figure 6:
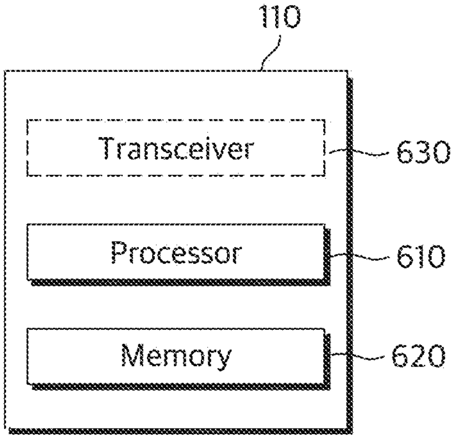
FIG. 6 is a diagram illustrating an example of an electronic apparatus.

FIG. 6 is a diagram illustrating an example of an electronic apparatus.

Referring to FIG. 6, the electronic apparatus 110 can include a processor 610, a memory 620, and a transceiver 630. The electronic apparatus 110 can be connected to the target user apparatus 120 and an external apparatus through the transceiver 630 and exchange data.

The processor 610 can include at least one apparatus described above through FIGS. 1 to 5 or perform at least one method described above through FIGS. 1 to 5. The memory 620 can store information for performing at least one method described above through FIGS. 1 to 5. The memory 620 may be volatile memory or non-volatile memory.

The processor 610 can execute a program and control the electronic apparatus 110 for providing information. Codes of the program executed by the processor 610 may be stored in the memory 620.

In addition, the electronic apparatus 110 can further include an interface that may provide information to a user (for example, a customer such as a target user) and the like.

The server or the terminal according to the above-described example implementations may include a processor, a memory for storing and executing program data, a permanent storage such as a disk drive, a communication port that communicates with an external device, and a user interface device such as a touch panel, a key, and a button. Methods implemented as software modules or algorithms can be stored in a computer-readable recording medium as computer-readable codes or program instructions executable on the processor. Here, the computer-readable recording medium includes a magnetic storage medium (for example, read-only memory (ROM), random-access memory (RAM), floppy disks, and hard disks) and an optically readable medium (for example, CD-ROM and digital versatile discs (DVDs)). The computer-readable recording medium can be distributed among network-connected computer systems, so that the computer-readable codes may be stored and executed in a distributed manner. The medium can be readable by a computer, stored in a memory, and executed on a processor.

The exemplary implementations may be represented by functional block elements and various processing steps. The functional blocks can be implemented in any number of hardware and/or software configurations that perform specific functions. For example, exemplary implementations may adopt integrated circuit configurations, such as memory, processing, logic, and/or look-up table, that can execute various functions by the control of one or more microprocessors or other control devices. Similarly, elements can be implemented as software programming or software elements, the exemplary implementations can be implemented in a programming or scripting language such as C, C++, Java, assembler, Python, etc., including various algorithms implemented as a combination of data structures, processes, routines, or other programming constructs. Functional aspects may be implemented in an algorithm running on one or more processors. Further, the exemplary implementations can adopt the existing art for electronic environment setting, signal processing, and/or data processing. Terms such as "mechanism," "element," "means," and "configuration" may be used broadly and are not limited to mechanical and physical configurations. The terms may include the meaning of a series of routines of software in association with a processor or the like.

What is claimed is:

1. A method of providing information by an electronic apparatus, the method comprising:

identifying a first video to be provided to a target user;

determining, based on information regarding the target user, whether the first video includes a segment that corresponds to a segment of a previously played video on which an action was previously performed, among one or more segments of the first video; and based on a determination that the first video includes the segment:

identifying that a relationship between a current playback position in the first video and a time period associated with the segment in the first video satisfies a set condition, and adjusting, based on the relationship satisfying the set condition, the current playback position to a position following the segment, wherein determining whether the first video includes the segment comprises:

identifying one or more attributes associated with each of the one or more segments, and determining whether the first video includes the segment based on the one or more attributes, and wherein the one or more attributes include amount of effort expended for generating content of the one or more segments.

2. The method of claim 1, wherein determining whether the first video includes the segment further comprises:

obtaining video viewing history information of the target user, identifying, from the video viewing history information, one or more actions related to interaction of the target user with videos, and identifying, based on the identified one or more actions, whether a segment corresponding to a segment of a previously played video is present among the one or more segments.

3. The method of claim 2, wherein identifying whether the segment is present among the one or more segments further includes at least one of:

determining whether the one or more actions include a request by the target user to skip a currently playing segment, or determining whether the one or more actions include an action indicating that the target user does not want to view a currently playing segment.

4. The method of claim 2, wherein obtaining the video viewing history information includes:

identifying one or more videos satisfying a set criterion related to the first video, and obtaining viewing history information of the target user for the identified one or more videos.

5. The method of claim 4, wherein the set criterion includes a requirement that a video belongs to a same playlist as the first video.

6. The method of claim 2, wherein determining whether the first video includes the segment further comprises obtaining preference information related to the interaction of the target user with videos based on the one or more actions, and wherein identifying whether a segment corresponding to a segment of a previously played video is present comprises identifying, based on the one or more actions and the preference information, whether a segment corresponding to a segment of a previously played video is present.

7. The method of claim 1, wherein the one or more attributes further include at least one of:

a degree of similarity between the content of the one or more segments and content of other videos previously played by the target user, a type of segment, a position of segment in the first video, or a production subject of segment, and wherein the amount of effort is associated with whether the content involves at least one of multiple splendid presentations, high-quality music, or high production costs.

8. The method of claim 7, wherein identifying the one or more attributes includes obtaining metadata of the first video, the metadata including at least one of the one or more attributes.

9. The method of claim 1, wherein the segment includes at least one of:

an opening section of the first video, an ending section of the first video, a story summary section for the first video, or additional material configured to play after completion of a main portion of the first video.

10. The method of claim 1, wherein the set condition includes a condition that a time interval between the current playback position and a starting point of the time period is less than a set threshold value.

11. The method of claim 1, wherein the set condition includes a condition that an input for changing a playing position of the first video to the position following the segment is not received from the target user.

12. A non-transitory computer-readable recording medium storing a program for executing the method of claim 1 on a computer.

13. An electronic apparatus for providing information, the electronic apparatus comprising:

a memory storing instructions; and a processor configured to execute the instructions to perform operations comprising:

identifying a first video to be provided to a target user, determining, based on information regarding the target user, whether the first video includes a segment that corresponds to a segment of a previously played video on which an action was previously performed, among one or more segments of the first video, and based on a determination that the first video includes the segment:

identifying that a relationship between a current playback position in the first video and a time period associated with the segment in the first video satisfies a set condition, and adjusting, based on the relationship satisfying the set condition, the current playback position to a position following the segment, wherein determining whether the first video includes the segment comprises:

identifying one or more attributes associated with each of the one or more segments, and determining whether the first video includes the segment based on the one or more attributes, and wherein the one or more attributes include amount of effort expended for generating content of the one or more segments.

14. The electronic apparatus of claim 13, wherein determining whether the first video includes the segment further comprises:

obtaining video viewing history information of the target user, identifying, from the video viewing history information, one or more actions related to interaction of the target user with videos, and identifying, based on the identified one or more actions, whether a segment corresponding to a segment of a previously played video is present among the one or more segments.

15. The electronic apparatus of claim 14, wherein identifying whether the segment is present among the one or more segments further includes at least one of:

determining whether the one or more actions include a request by the target user to skip a currently playing segment, or determining whether the one or more actions include an action indicating that the target user does not want to view a currently playing segment.

16. The electronic apparatus of claim 14, wherein obtaining the video viewing history information includes:

identifying one or more videos satisfying a set criterion related to the first video, and obtaining viewing history information of the target user for the identified one or more videos.

17. The electronic apparatus of claim 16, wherein the set criterion includes a requirement that a video belongs to a same playlist as the first video.

18. The electronic apparatus of claim 14, wherein determining whether the first video includes the segment further comprises obtaining preference information related to the interaction of the target user with videos based on the one or more actions, and wherein identifying whether a segment corresponding to a segment of a previously played video is present comprises identifying, based on the one or more actions and the preference information, whether a segment corresponding to a segment of a previously played video is present.

19. The electronic apparatus of claim 13, wherein the one or more attributes further include at least one of:

a degree of similarity between the content of the one or more segments and content of other videos previously played by the target user, a type of segment, a position of segment in the first video, or a production subject of segment, wherein the amount of effort is associated with whether the content involves at least one of multiple splendid presentations, high-quality music, or high production costs, and wherein identifying the one or more attributes includes obtaining metadata of the first video, the metadata including at least one of the one or more attributes.

20. The electronic apparatus of claim 13, wherein the segment includes at least one of:

an opening section of the first video, an ending section of the first video, a story summary section for the first video, or additional material configured to play after completion of a main portion of the first video, wherein the set condition includes a condition that a time interval between the current playback position and a starting point of the time period is less than a set threshold value, and wherein the set condition includes a condition that an input for changing a playing position of the first video to the position following the segment is not received from the target user.

* * * * *